United States Patent [19]

Boyle

[11] 4,353,968

[45] Oct. 12, 1982

[54] BATTERY WATER-FILLING SYSTEMS AND CHECK VALVES THEREFOR

[76] Inventor: Robert E. Boyle, 2807 Mitchell, Woodridge, Ill. 60517

[21] Appl. No.: 283,522

[22] Filed: Jul. 15, 1981

[51] Int. Cl.³ .............................................. H01M 2/36
[52] U.S. Cl. ........................................ 429/64; 429/76; 141/35; 137/260
[58] Field of Search ........................... 429/64, 74, 76; 137/260; 141/35, 36, 95, 285

[56] References Cited

U.S. PATENT DOCUMENTS

| | | | |
|---|---|---|---|
| 1,403,041 | 1/1922 | Lawson | 429/74 |
| 3,871,923 | 3/1975 | Ikeda | 429/64 |

Primary Examiner—Donald L. Walton
Attorney, Agent, or Firm—Brezina & Buckingham

[57] ABSTRACT

An improvement in a water-filling system for batteries, which protects battery cells from damage caused by hydrogen explosions occurring at other cells, is a check or stop valve, placed in the fluid communication lines between two cells, which allows passage of water, but blocks passage of an explosive shock wave.

10 Claims, 4 Drawing Figures

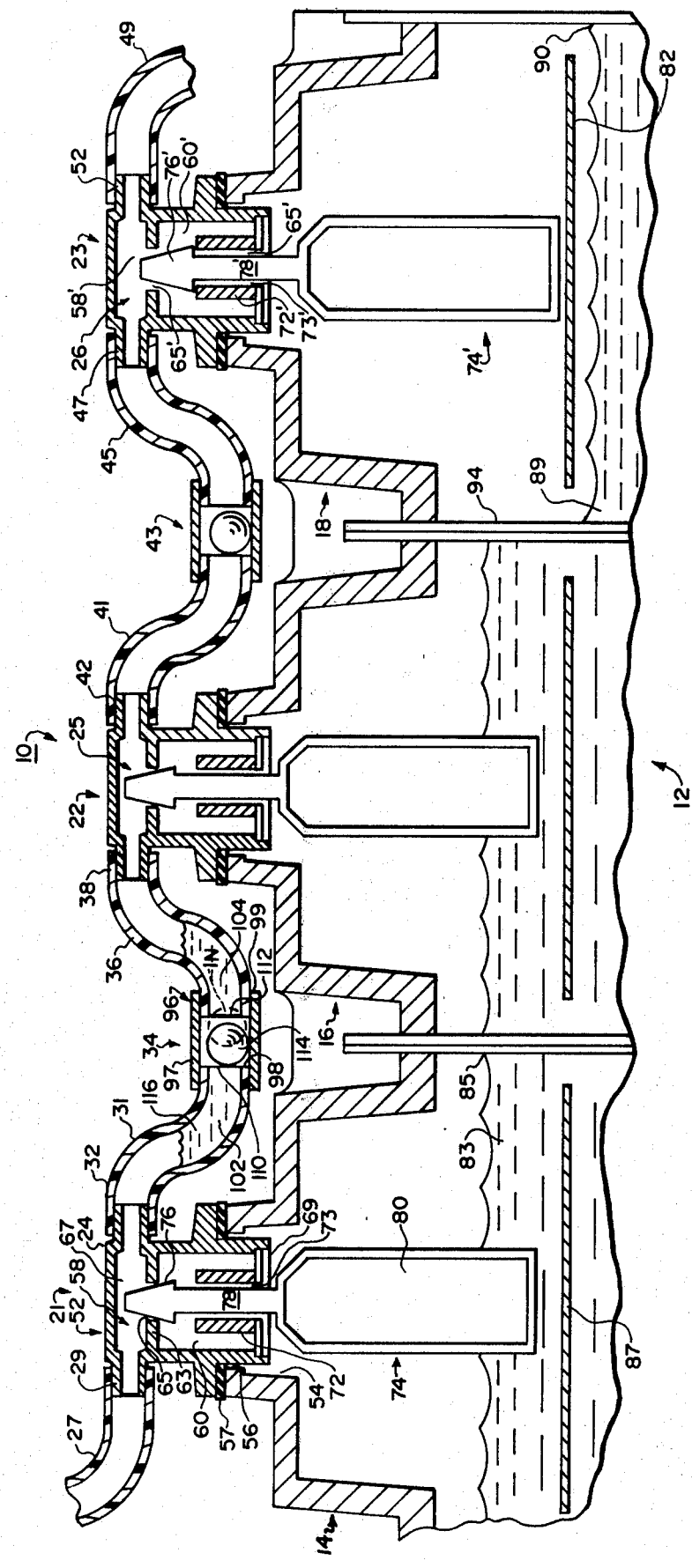

BATTERY WATER-FILLING SYSTEMS AND CHECK VALVES THEREFOR

TECHNICAL FIELD

The present invention relates to water-filling systems for battery cells, and it more particularly relates to safety improvements therefor.

BACKGROUND ART

Batteries are being used ever more frequently for powering electric vehicles for on-the-road use, as well as for industrial vehicles, such as forklift trucks. Water-filling or "topping-up" systems have been employed for replenishing the water supply in each cell of the battery for the vehicle. The use of such a system enables a decrease in the time and expense as compared to manual battery maintenance operations.

However, in such water-filling systems, the cells of a battery are interconnected by tubes or conduits through which the water flows. Such connections can give rise to a problem in that the hydrogen gas, which oftentimes evolves during operation of the battery, does not readily vent into the atmosphere, as it would in the absence of the interconnecting tubes. A highly explosive hydrogen/air mixture can be formed at a cell. Ignition of the mixture at one cell, by an accidental static discharge or for any other reason, can cause an explosion. The explosive shock wave, traveling through the tubes, can initiate hydrogen/air explosions at other positions along the conduits, thereby causing damage to other ones of the interconnected cells.

Therefore, it would be highly desirable to have an improved battery water-filling system which greatly reduces the hazard of multiple cell damage caused by an accidental hydrogen explosion at one cell. It would be further desirable to have such a system which is inexpensive to make and which is simple to install and to operate.

DISCLOSURE OF THE INVENTION

Therefore, it is a principal object of the present invention to provide an improvement in automatic battery water-filling systems, which greatly reduces the possibility of multiple cell damage resulting from hydrogen explosions.

The above and other objects of the present invention are realized by providing in the fluid interconnections between battery cells in a battery-filling system, a check or stop valve, which permits water flow to the battery cells during a topping-up operation therefor, and which blocks and seals off the passage of an explosive shock wave of hydrogen gas in the event of an accidental explosion. Thus, other cells are protected from the resulting shock wave.

The check valve of the present invention includes a housing having a substantially horizontal elongated chamber therein, and a freely movable valve member captured therein. The chamber has inlet and outlet ports, surrounded by respective inlet and outlet valve seats to cooperate with the valve member for controlling the flow of liquid through the chamber. The ports of the valve are connected in fluid communication between two of the battery cells. The valve member, chamber, and valve seats cooperate to permit passage therethrough of liquid for topping-up purposes, and for blocking passage of an accidental explosive shock wave.

The housing includes a large first tube, which has a first inside diameter, and which defines the elongated chamber. A pair of small second and third tubes, each having second inside diameters, extend, in a tight press fitting relation, into opposite ends of the first tube. The end portions of the second and third tubes form the valve inlet and outlet ports and valve seats. The end portions of the second and third tubes also define internal annular shoulders.

The valve member is substantially spherical in shape, is composed of solid dense material, and has a diameter less than the first inside diameter and greater than the second inside diameters. The weight of the valve member is such that it resists rolling up over, or being levered over, either one of the internal annular shoulders into flow-blocking engagement with a valve seat during normal filling operation. The valve member is moved over either one of said shoulders into flow-blocking engagement with a valve seat when subjected to the force of an explosive shock wave, thereby isolating the damage caused to the battery as a result of an explosion.

The check valve of the present invention is inexpensive to manufacture and can easily be used in existing as well as new battery-filling systems.

BRIEF DESCRIPTION OF THE DRAWINGS

The above mentioned and other objects and features of this invention and the manner of attaining them will become apparent, and the invention itself will best be understood by reference to the following description of embodiments of the invention taken in conjunction with the following drawings wherein:

FIG. 1 is an elevational sectional view, partly schematic and partly fragmentary, of the improved battery-filling system of the present invention, shown in operative position on a battery.

BEST MODE OF CARRYING OUT THE INVENTION

Figure 3:
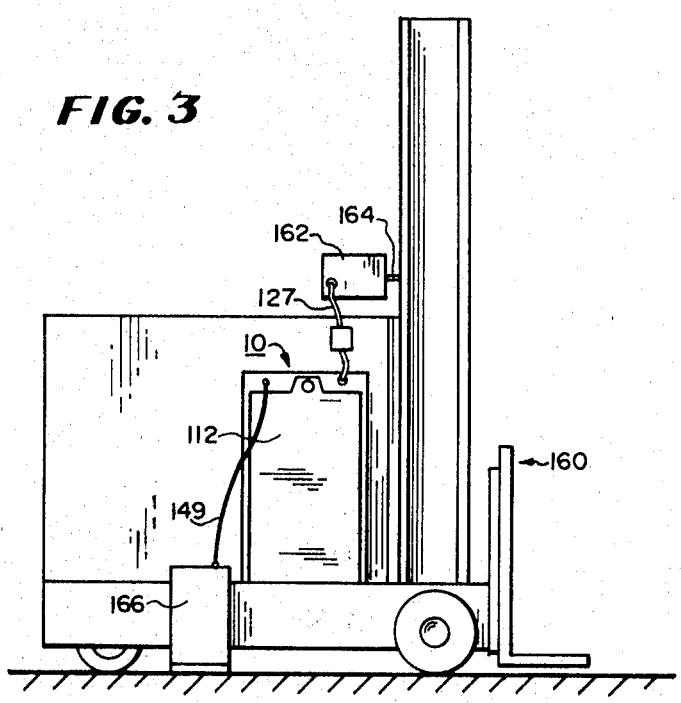
FIG. 3 is an elevational side view of an electric forklift truck, showing, schematically, the battery-filling system of the present invention, in operative position for filling a battery.

Referring now to the drawings and especially to FIG. 1, there is shown a battery water-filling system 10, constructed in accordance with the present invention, which is depicted in operative position for filling a battery 12 having a series of cells, such as the cells 14, 16 and 18. A series of filling caps 21, 22 and 23, having water filling float actuated cell valves 24, 25 and 26, respectively, serve as closures for the cells 14, 16 and 18, respectively.

A series of tubes or conduits connect the cell caps in series fluid communication to distribute water to the cells through the cell valves in the caps. In this regard, a tube 27 is connected to a source (not shown) of water for filling the battery 12 and to a fluid flow connector 29 of the cap 21. A tube 31 is connected to a fluid flow connector 32 of the cap 21 and to a check or stop valve 34. A tube 36 connects the check valve 34 in fluid communication with a fluid flow connector 38 of the cap 22.

One end of a tube 41 is connected to a fluid flow connector 42 on the cell valve 22. The other end of the tube 41 is connected to a check valve 43. One end of a tube 45 is connected to a fluid flow connector 47 on the cap 23. A tube 49 is connected to a fluid connector 52 of the cap 23 and extends to another cell cap (not shown), or to a water reservoir (not shown).

For filling the battery 12, water is introduced from the source into the tube 27 and flows under the force of gravity, at a rate predetermined by the operator, through the tubes, caps, cell valves and check valves, the excess water draining into the water reservoir. In a manner which will be described presently, the cell valves 24, 25 and 26 permit water to enter the respective cells 14, 16 and 18 when the electrolyte liquid thereof is below desired predetermined levels, and cut off, or do not allow, water input to the respective cells when the electrolyte levels thereof are at the predetermined levels.

During normal battery-filling operation, the check valves 34 and 43 are in their open positions, and present relatively little impedance to liquid flow, when they are subjected to the forces exerted by the predetermined rate of water flow. They are adapted to close, and thus present a high impedance to fluid flow, when subjected to forces exerted by the shock wave of a hydrogen gas explosion occurring in any one of the cells at their cell caps 21, 22 and 23 and their associated tubes. Thus the possibility is greatly reduced of an explosion occurring at one of the cells 14, 16 and 18 causing damage to the other ones of the cells.

Figure 2:
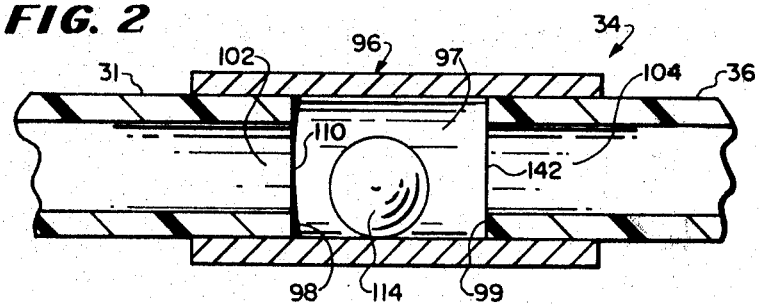
FIG. 2 is an elevational, sectional view in enlarged scale, of the check valve of the present invention.

Considering now the caps 21, 22 and 23, and their cell valves 24, 25 and 26 in greater detail with reference to FIGS. 1 and 2, the caps and cell valves are constructed of electrolyte-resistant materials. The caps and their cell valves are identical in construction, and therefore, for convenience, only the cap 21 and the valve 34 will now be described in greater detail. Like elements in the caps 22 and 23 and cell valves 25 and 26 are indicated by primed numbers.

The cap 21 is used in place of the normal vent cap (not shown) of the cell 14. The cap 21 has a substantially cylindrical hollow closed-ended housing 52 which fits into the cell opening 54 of the cell 14, is secured therein by the thread 56 on the outer periphery of the housing 52, and is sealed thereto by a gasket 57. The housing 52 is divided into an upper chamber 58 and a lower chamber 60 by a horizontally-disposed dividing wall 63. A circular opening 65 is disposed centrally in the wall 63 and, as will be described hereinafter, functions as a valve port and valve seat for the cell valve 24.

The upper chamber 58 includes a plenum area or chamber 67 which is connected in fluid communication with the fluid flow connectors 29 and 32, and, with them, constitutes a continuous fluid flow pathway through the chamber 58 for passage of water for filling the battery 12.

The lower chamber 60 has a lower, horizontally disposed, wall 69 and, a centrally disposed upstanding tube or boss 72 having a longitudinal bore 73 which functions, as will be described, as a valve port and support guide member for a buoyancy unit or float 74 which is designed to be buoyant in battery electrolyte liquid. The upper portion of the float 74 is a frustoconically-shaped valve member or element 76 having a maximum lower diameter greater than either that of the opening 65 in the wall 63 and the bore 73 in the tube 72. The central portion of the float 74 is a cylindrical shank 78, integral with the element 76, and extending downwardly therefrom, and received loosely in the bore 73. At the lower end of the shank 78, and integral with it, is a hollow member 80 which is partially immersed in the battery electrolyte liquid 83 of the cell 14.

In operation, the float 74 is urged upwardly by the buoyancy forces exerted thereon by the electrolyte liquid 83. In the cell 14, the electrolyte liquid 83 is at a proper level 85 above a battery plate 87 of the cell 14. The float 74 is urged into contact with the opening 65 by the buoyancy forces and, because the diameter of the float 74 is greater than that of the opening 65, a sealing engagement is made, thus any flow of water from the plenum 67 into the lower chamber 60, and thence through the passage between the shank 78 and the bore 73 into the cell 14, is prevented.

In cell 16, the electrolyte level is also at the proper level and the cell valve 25 blocks water input to the cell 16.

In cell 18, an electrolyte liquid 89 is at a low level 90 with respect to a battery plate 82 of the cell 18. A buoyancy unit or float 74' is not buoyed up by the electrolyte liquid 89, the bottom of the frustoconical valve member or element 76' rests, freely, on the top of an upstanding tube or boss 72'. An opening 65' is unobstructed so that water from a plenum 58' flows into a lower chamber 60', past the loose-fitting contact of an element 76' with the top of the tube 72' through the passage between a shank 78' and the bore 73', and into the cell 18. Water is admitted continuously until the electrolyte level 89 reaches a desired level indicated at 94. At this level, the element 76' is urged into sealing engagement with the opening 65' and water flow into the cell terminates.

Considering now the check valves 34 and 43, with reference to FIGS. 1 and 2, both valves are identical in construction and in operation, therefore only the construction and operation of the valve 34 will now be described in detail.

The valve 34 includes a substantially horizontally-disposed elongated tubular housing 96 having an elongated chamber 97 of uniform diameter throughout its length. The chamber 97 has, at opposite ends thereof, and integral therewith, a pair of internal, annular flanges or shoulders 98 and 99 defining, respectively, axially aligned annular inlet and outlet ports 102 and 104. The ports 102 and 104 provide access for the flow of topping-up water from the cap 21 through the tubes 31 and 36 to the cap 22.

The shoulders 98 and 99 are formed by the respective ends of the tubes 31 and 36 which are press fitted tightly into the opposite ends of the housing 96. The shoulders 98 and 99, respectively, define valve seats 110 and 112. A substantially spherical valve member 114 is captured freely within the chamber 97 and moves forcibly into engagement with either one of the valve seats to block fluid passage through the housing 96 should an accidental hydrogen explosion occur.

The member 114 has a diameter less than that of the chamber 97 for allowing free movement therein. The diameter of the member 114 is greater than that of the valve seat 110 or 112 for preventing fluid passage therethrough when the member is urged into contact therewith.

The operation of the valve 34 is best described with reference to FIGS. 1 and 2. The valve 34 is connected for fluid communication between the caps 21 and 22 by the tubes 31 and 36. The valve is mounted in a substantially horizontal position and with the upper surface of the housing 96 below the level of the connectors 32 and 38 of the caps 21 and 22. Filling-up water is introduced into the tube 27 and flows through the cap 21, associated tubes, the check valve 34, and into the cap 22.

The flow rate of the filling water, or the weight of the member 114, or both the water flow rate and the weight of the member 114 are adjusted as discussed hereinafter, so that, with a flow rate of water operative for filling the battery 12, the force of the flowing water against the member 114 is not sufficient to urge it, by a levering or camming action, to move, or roll, up off the bottom of the chamber 97, over the shoulder 98 or 99 and over the lower edge of the seat 110 or 112 fully to engage therewith. When the member 114 is not engaged with the seat 110 or 112, water flows readily through the valve 34.

A hydrogen gas explosion occurring at the cell valve 24 or 25, initiated, for example, by a static discharge, causes an explosive shock wave to travel through the tubes 31 or 36, respectively, and has sufficient force to overcome the weight or inertia of the member 114 and urge it over the shoulder 98 or 99 and into flow-blocking contact with the seat 110 or 112. The position of the member 114 shown in phantom lines in FIG. 1 illustrates the position it would assume to impede the shock wave of an explosion occurring in, or at, the cell valve 24 from traveling through the valve 34 and tube 36 to damage the cell valve 25 and cell 16.

The positioning of the valve 34 below the level of the connectors 32 and 38 provides an additional blocking function: when filling is completed and the flow of water is stopped, water drains out of the tubes into a reservoir (not shown) but water 116 remains in the low-lying valve 34 and functions as a liquid seal between the caps 21 and 22.

The flow rate for filling is preferably one which will complete the task in a relatively short time to prevent excessive out-of-duty periods for the equipment powered by the battery 12. A period of 5 to 30 minutes is preferred and may be varied by changing the pressure of the water introduced into tube tube 27. The member 114 must be sufficiently heavy, or have enough inertia, to resist being urged ove a shoulder 98 or 99 by the water pressure. Too light a member 114 would block water flow at very low rates, too heavy a member 114 would tend to be less effective in blocking explosive shock waves. It is preferred that the member 114 be made of lead.

As shown in FIGS. 1 and 2, the valve 34 is preferably made of three lengths of tubing: a large central length of tubing having a first inside diameter, and two end lengths having outside diameters such that they can be extended, in a tight press fitting relation, into opposite ends of the central length. The member 114 is movably contained the central length, which corresponds to the housing 97. The shoulders 98 and 99 are formed by the wall thickness of the two end lengths of tubing, which are cut off substantially perpendicular to their longitudinal axes. The valve seats 110 and 112 correspond to the inside tube openings defined by the ends of the end lengths of tubing extending into the opposite ends of the central length of tubing. It is preferred that at least the central length of tubing be made of transparent material to permit visual inspection of the functioning of the member 114. It will be apparent to those skilled in the art that the tubes 31 and 36 of FIG. 1 are used to form the end lengths of the valve 34 in the preferred embodiment.

The tubes used in the preferred embodiment are preferably of flexible material, having some degree of resilience, and resistant to the corrosive and heat conditions occurring in battery environments. The material preferably possesses the high dielectric strength of an electrical insulator and has sufficient conductivity to minimize the buildup of a static electricity charge. Suitable materials include, for example, "vinyl" (polyvinylchloride), cross-linked polyethylene, and polypropylene. These materials are modified or formulated, if necessary, to enhance flexibility, acid resistance and antistatic properties.

Suitable approximate dimensions for the tubes and the member 114 of the preferred embodiment of the check valve 34 are: central tubing: ½ inch outer diameter, 1/16 inch wall thickness, and ⅜ inch inner diameter. End lengths of tubing: ⅜ inch outer diameter, 1/16 inch wall thickness, ¼ inch inner diameter. Diameter of member 114: 5/16 inch.

It will be apparent that the use, for the valve seats 110 and 112, of material having a degree of resilience creates an effective flow-blocking seal when the member 114 is urged into engagement with the seats 110 and 112, without permanent deformation thereof.

While only the two valves 34 and 43 and the three cells 14, 16 and 18 are described in FIG. 1, it will be apparent that the improvement of the present invention is useful with any number of cells in a battery. Placing one valve, such as the valve 34, in the fluid communication line or conduit, between two successive cells, such as the cells 14 and 16, is repeated for every such pair of cells in a battery. This provides protection of each cell from the transmission, through the fluid communication lines, of explosive shock waves created by hydrogen explosions at other cells connected to the battery filling lines.

Referring now to FIG. 1, the method of installing and using the improved system of the present invention will be described. The system 10 is installed in a battery 12 by first removing the normal cell vent caps (not shown) and replacing them with caps such as the cap 21 which combine a venting function, provided by a conventional vent hole (not shown) in the cap 21, with a water-filling float valve 24. The caps such as the caps 21, 22 and 23 are then interconnected for fluid flow, with a valve, such as the valves 34 and 43, between each pair of directly-connected cells. The source of water (not shown) and the drain or drain reservoir (not shown) are connected in fluid communication with the system 10, so that water flow is directed to, and through, every cap on the battery. The filling of each cell occurs automatically in that the valves 24, 25 and 26 permit water to flow into or alternatively prevent water flow into, the cell, as required. The rate of flow of water is regulated to give, preferably, a total time for a filling operation of from about 5 to 30 minutes for a conventional forklift truck battery. At the conclusion of the topping-up operation, the cells are disconnected from the water source and drain reservoir. The caps, interconnecting tubes and cell valves are left in place on the battery so that further filling operations are carried out by simply connecting the feed and drain lines to the appropriate water source and drain.

Referring now to FIG. 3, system 10 of the present invention is shown mounted in place on the battery 112 of a forklift truck 160. A water reservoir 162 is adjustably attached to a member 164 of the truck 160 and is disposed above the level of the battery 112. A tube 127 connects the reservoir 162 with the system 10 for introducing water thereinto. A tube 149 connects the system 10 to a drain reservoir 166 located on the ground, beside the truck 160. In use, the height of the reservoir 162 is adjusted to give a head, or pressure, of water sufficient to complete filling of the battery 12 within the desired time. At the conclusion of the filling, the tubes 127 and 149 are disconnected from the reservoir 162 and drain 166, respectively, and, if desired, the reservoir is removed.

Figure 4:
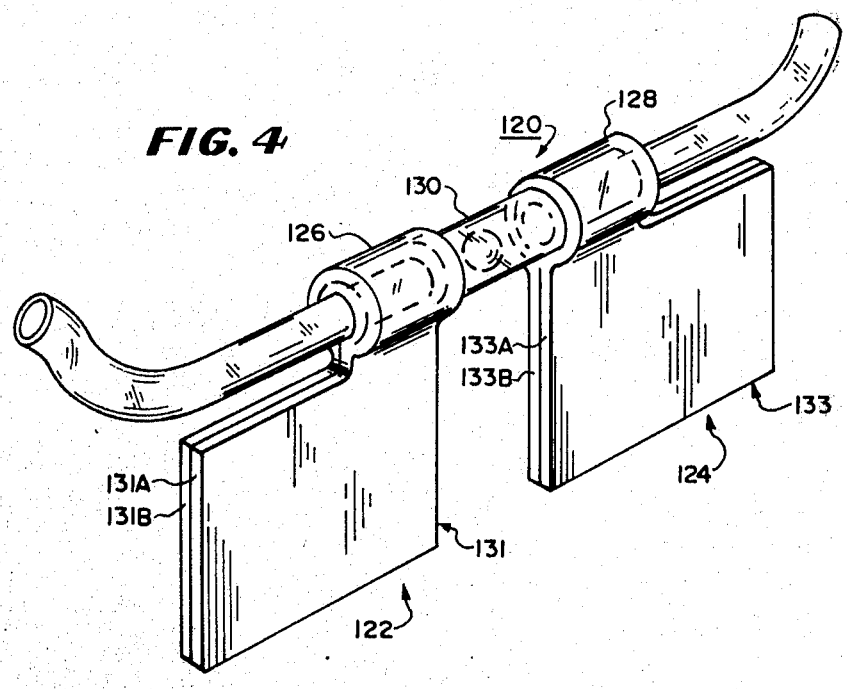
FIG. 4 is a pictorial view of another embodiment of the check valve of the present invention, shown in enlarged scale.

Referring now to FIG. 4, there is shown a check or stop valve 120, which is constructed in accordance with this invention and which is similar in construction and in operation to the valve 34 except that it includes a pair of mounting ears 122 and 124 for fixing the valve 120 in place on top of a battery container.

The ears 122 and 124 include a pair of tubular mounting collars 126 and 128, respectively, which are mounted at opposite ends of a housing 130 of the valve 120. The collars 126 and 128 are dimensioned suitably for receiving and surrounding the end portions of the housing 130 in a tight-fitting manner. A pair of flat plates 131 and 133 are integral with the collars 126 and 128, respectively, and lie in the plane of the longitudinal axes of the collars 126 and 128 and housing 130. The plate 131 comprises a pair of overlying plates 131A and 131B which are integrally connected at their upper edges to the collar 126. Similarly, the plate 133 comprises a pair of overlying plates 133A and 133B which are integrally connected at their upper edges to the collar 128. The mounting ears 122 and 124 are preferably made of material which can resist the heat and corrosive environment of a battery, with polypropylene being preferred.

In use, the ears 122 and 124 are inserted in the tarry battery-sealing compound between adjacent battery cell containers (not shown) and serve to hold the valve housing 130 securely against vibration or movement of the battery on which it is mounted.

While the preferred embodiments of the present invention have been illustrated and described, it will be apparent that other changes, modifications and applications may be made within the spirit and scope of the invention. It is intended that all such changes, modifications and applications be included within the scope of the appended claims.

I claim:

1. In combination with a system for filling a series of cells of a battery with an electrolyte liquid by distributing it to the cells via a series of cell valves individually associated with each one of the cells for admitting the liquid thereto and for shutting off the flow of liquid thereto when the liquid rises to desired levels therewithin, conduit means interconnecting the cells in fluid communication with a source of electrolyte liquid under pressure, the improvement which comprises:

a check valve being connected in fluid communication between two of said cells and including a housing having a substantially horizontal elongated chamber; said chamber having at its opposite ends inlet and outlet ports and having inlet and outlet valve seats, a heavy valve member captured within said chamber for engaging said seats; said ports being connected in fluid communication with said conduit means between two of said valve members for allowing operative flow of liquid through said valve from said inlet to said outlet; and for being urged forcibly into flow-blocking engagement with one of said valve seats by an explosive shock wave caused either upstream or downstream of said valve.

2. The check valve of claim 1, wherein said housing includes a large first tube having a first inside diameter, said first tube defining said elongated chamber; and a pair of small second and third tubes, each having second inside diameters and extending into opposite ends of said first tube in tight press-fitting relation thereto, whereby the inlet and outlet ports and valve seats are formed by the end portions of said second and third tubes and whereby said end portions of said second and third tubes define internal annular shoulders.

3. The check valve of claim 2, wherein said valve member is spherical in shape and is composed of solid dense material having a diameter less than said first inside diameter and greater than said second inside diameter, and having a centain weight for resisting rolling up over either one of said internal annular shoulders into flow-blocking engagement with said valve seat when said valve member is subjected to the force of a flow of liquid through said check valve and for being moved over either one of said shoulders into flow-blocking engagement with said valve seat when subjected to the force of an explosive shock.

4. The check valve of claim 3, wherein said valve member is composed of lead meterial.

5. The check valve of claim 4, wherein said tubing is polyvinylchloride material.

6. The check valve of claim 4, wherein said tubing is polypropylene material.

7. The check valve of claim 4, wherein said tubing is cross-linked polyethylene material.

8. The check valve of claim 3 further including plate-like means adapted for mounting said valve on a battery.

9. The check valve of claim 2 further including means for connecting said valve at a lower elevation relative to cell valves to form a trap for liquid.

10. A water-filling system utilizing the check valve of claim 1, wherein each cell of the battery has a cell-filling cap including fluid flow-connection means and automatic valve means, said valve means adapted to permit fluid input into said cell when the electrolyte level thereof is below a predetermined level and to cut off fluid input thereto when the electrolyte level thereof reaches a predetermined level; wherein a plurality of said filling caps are interconnected for fluid communication therebetween by said conduit means between said fluid flow-connection means; and wherein said source of liquid is connected by said conduit means to the fluid flow-connection means of said caps for supplying liquid thereto to enable the cells to be filled.

* * * * *